United States Patent [19]
Berge et al.

[11] Patent Number: 6,160,061
[45] Date of Patent: Dec. 12, 2000

[54] PROCESS FOR PREPARING AN AQUEOUS EMULSION WITH NARROW DROPLET SIZE DISTRIBUTION, THE USE OF SUCH AN EMULSION FOR PREPARING A POLYMER DISPERSION, AND THE RECOVERY OF POLYMER PARTICLES FROM SUCH A DISPERSION

[75] Inventors: Arvid Berge, Trondheim; Kari-Anne Leth-Olsen, Porsgrunn; John Ugelstad deceased, late of Trondheim, by Viola Ugelstad Sommervold, legal representative; Anne Dalager Dyrli, Trondheim; Steinar Pedersen, Skien, all of Norway

[73] Assignee: Nyfotek A/S, Trondheim, Norway

[21] Appl. No.: 09/230,034

[22] PCT Filed: Jul. 16, 1997

[86] PCT No.: PCT/NO97/00182

§ 371 Date: Mar. 4, 1999

§ 102(e) Date: Mar. 4, 1999

[87] PCT Pub. No.: WO98/03555

PCT Pub. Date: Jan. 29, 1998

[30] Foreign Application Priority Data

Jul. 18, 1996 [NO] Norway ..................................... 936003

[51] Int. Cl.⁷ ................................... C08F 2/22; C08J 3/03
[52] U.S. Cl. .............................. 526/78; 524/804; 526/87; 526/82; 526/207; 526/208; 526/212
[58] Field of Search .............................. 524/804; 526/78, 526/82, 87, 207, 208, 212

[56] References Cited

U.S. PATENT DOCUMENTS 4,113,687  9/1978  Ugelstad .
4,563,510  1/1986  Ugelstad .

FOREIGN PATENT DOCUMENTS 0 003 905  9/1979  European Pat. Off. .
003 905    9/1979  European Pat. Off. ........... C08J 3/02

*Primary Examiner*—David W. Wu
*Assistant Examiner*—Kelechi C. Egwim
*Attorney, Agent, or Firm*—Wenderoth, Lind & Ponack, L.L.P.

[57] ABSTRACT

A process for preparing an aqueous emulsion with a narrow droplet size distribution of an oily material comprising one or more highly water insoluble substances, wherein the oily material is homogenized in a hydrophilic phase in which the oily material is more soluble than in water, but still so insoluble that an emulsion is formed by the homogenization, and the emulsion is subsequently diluted with a high proportion of water to form a stable emulsion of the oily material having the desired narrow size distribution. The stable emulsion may be mixed with an excess of a partly water soluble material which becomes absorbed by the droplets of the oily material. Said partly water soluble material may comprise a polymerizable monomer, and polymerization is subsequently effected to prepare a dispersion of polymer particles, and if desired, the polymer particles are recovered from said dispersion.

20 Claims, 4 Drawing Sheets

PROCESS FOR PREPARING AN AQUEOUS EMULSION WITH NARROW DROPLET SIZE DISTRIBUTION, THE USE OF SUCH AN EMULSION FOR PREPARING A POLYMER DISPERSION, AND THE RECOVERY OF POLYMER PARTICLES FROM SUCH A DISPERSION

The present invention relates to a process for preparing emulsions with a controlled and variable droplet size, of an oily material comprising a highly water insoluble, relatively low molecular weight organic substance or mixtures of such substances, and of mixtures of such highly water insoluble substance(s) with one or more slightly water soluble substances. In particular it relates to the formation of emulsions with a relatively narrow droplet size distribution, even with relatively large average droplet sizes. The emulsions prepared according to the present invention may subsequently be used for the preparation of polymer dispersions, from which polymer particles may be recovered.

Conventional methods for the preparation of emulsions of more or less water insoluble organic liquids comprise the use of effective homogenization equipment. Such emulsions are generally the object of degradation which may take place by two mechanisms. Droplets which come in contact of one another may flocculate, i.e., pass over into greater accumulation, which may be followed by coalescence. This form of degradation may be hindered by use of effective emulsifiers providing layers at the droplet surface which give an effective electrical or sterical hindrance to the aggregation. Another type of degradation which may be predominant with relatively small droplets is degradation by diffusion which is due to that the solubility of a certain material in a small drop in a continuous phase is higher than of the same material in a larger drop. Therefore a slightly water soluble material will diffuse from small droplets to larger droplets so that a steadily more coarse dispersion is formed. This degradation assumes that the dispersed phase has a certain solubility in the continuous phase. However the degradation will be effected relatively fast even with materials with a relatively low solubility in the continuous phase, in the order of 0.1 to 0.01 gram per liter.

It has been described in the literature that one may form stable emulsions of slightly water soluble materials by having dissolved in the slightly water soluble compound a small amount of a highly water insoluble compound in the order of 1–2% based upon the amount of the slightly water soluble compound. In this case one experiences that after a small amount of the slightly water soluble compound has been transported from small to larger droplets, the emulsion is stable because the driving force for a further transport of the slightly water soluble compound becomes balanced by a concentration potential in the opposite direction. In Norwegian Patents 139.410 and 140.932 there is described a method where an aqueous emulsion of slightly water soluble compounds is prepared in a two-step process. In the first step a finely divided emulsion in water of a highly water insoluble compound or mixtures of such compounds is prepared by an effective homogenization, and in the next step the slightly water soluble compounds are allowed to diffuse into the droplets formed in the first step, to form emulsions of the slightly water soluble compounds which in case they are monomers may be polymerized by an initiator which may be water soluble or oil soluble and in the latter case introduced in the different ways discussed above. In Norwegian Patent 145.164 there is also described a similar process where the highly water insoluble compound is an initiator. The success of these methods where one homogenizes the organic compounds in pure water is often dependent upon an effective homogenization which gives very small droplets. This method of preparing latexes has the great advantage that one only has to homogenize the highly water insoluble compound which normally makes up only about 1% of the monomer added in the next step. The mentioned Norwegian patents describe the use of the method for production of PVC latexes. In this case the droplets of the highly water insoluble compounds ("substance I") have a diameter of about 0.03 to 0.2 $\mu$m. After absorption of vinyl chloride and polymerization one obtains a final latex of PVC particles with a diameter varying from 0.15 to 1.2 $\mu$m. By the conventional methods of homogenization the size and size distribution will be determined by the efficiency of the homogenization equipment, the effect (pressure applied in the homogenization) and the type and amount of emulsifier applied. With the usual equipment which is based upon mechanical force it is most often observed that one in order to get a dispersion free from large droplets has to perform an intensive homogenization which implies that one gets a relatively low average value of the droplet size. In case one applies a reduced pressure in the homogenizer in order to get a larger average droplet size one invariably obtains a considerable fraction of very large droplets and thus a broad size distribution. In the emulsion formed in the homogenization procedure of the first step this may lead to a greater tendency to creaming or settling. When the dispersion of the highly water insoluble liquid formed in the first step is used for absorption of slightly water soluble compounds in the next step the resulting droplets show an even broader size distribution, because the larger droplets will absorb a relatively larger amount of the slightly water soluble compound. If the slightly water soluble compound is a vinyl monomer which afterwards has to be polymerized, the presence of large droplets may give extra difficulties due to a greater tendency towards agglomeration and coalescence during polymerization.

According to the present invention there is provided a process for preparing an aqueous emulsion with a narrow droplet size distribution of an oily material comprising one or more highly water insoluble substances (substance I). A characteristic feature of the invention is that the oily material is homogenized in a hydrophilic phase in which the oily material is more soluble than in water, but sufficiently insoluble to form an emulsion by the homogenization, and the emulsion is subsequently diluted with a high proportion of water to form a relatively stable emulsion of the oily material having the desired narrow size distribution.

The longer the dilution is delayed, the more inter droplet diffusion will take place, and the resulting emulsion will have a less narrow droplet size distribution compared with the situation when the dilution is made immediately.

The oily material may be a mixture of several different materials, some of which may be solids. However, the resulting mixture should have an oily character. The oily material must comprise at least one highly water insoluble substance, and it may in addition also contain one or more slightly water soluble substances. The content of the highly water insoluble substance should be at least 10% by weight of the oily mixture. It is preferred that the different components of the oily material form a homogeneous mixture.

The highly water insoluble substance(s) should have a solubility of less than $10^{-2}$ g/l, preferably less than $10^{-3}$ g/l, in pure water at 20° C. If said water insoluble substance(s) is (are) solid at 20° C., it (they) should have said solubility at a temperature immediately above the melting temperature.

As mentioned above, the optional slightly water soluble substance(s) may be an inert material or materials which can participate in a subsequent reaction. The same also applies to the highly water insoluble substances.

Normally, the hydrophilic phase used for the preparation of the aqueous emulsion of the oily material is a mixture of water and an ordinary organic water miscible solvent. Examples of such solvents are lower alkanols such as methanol, and lower dialkyl ketones such as acetone. When the emulsion prepared during the homogenization is subsequently diluted with water, it is stabilized against degradation by diffusion, since the solubility in the continuous phase of the diluted emulsion will be much lower than in the initial continuous phase used during the homogenization.

It is also possible to remove some of or all the organic solvent(s) in the continuous phase, since this will further increase the stability of the emulsion.

It is often desireable to use an emulsifier during the homogenization, since this will facilitate the homogenization itself and stabilize the resulting emulsion.

After the relatively stable emulsion has been prepared, it is possible to add a partly water soluble material, and said partly water soluble material will then become absorbed by the droplets in the emulsion. The amount of the partly water soluble material added at this stage will normally be from 20 to 5000 times the volume of the oily material in the emulsion. The slightly water soluble material used during the homogenization may or may not be the same as the partly water soluble material which is subsequently added to the relatively stable emulsion.

The present invention is particularly advantageous in connection with the use of the relatively stable emulsion for the preparation of a polymer dispersion. In that case it is necessary to have an initiator and a vinyl monomer present. The initiator and/or the monomer may be present as a highly water insoluble material or may be present as a slightly water soluble substance during the preparation of the aqueous emulsion. A partly water soluble vinyl monomer and/or initiator may be added to the aqueous emulsion and will subsequently be absorbed by the droplets of said emulsion. If initiator and monomer are both added at this stage, they may be added together or separately, and, if desired, in a suitable solvent.

If a slightly water soluble monomer or initiator is present together with a highly water insoluble substance during the homogenization, it must have the proper solubility properties to form an emulsion in the hydrophilic phase. Similarly, a monomer or an initiator added to the relatively stable aqueous emulsion must have the proper solubility properties to diffuse through the aqueous phase and become absorbed by the droplets of the emulsion.

It is, of course, possible that all the highly water insoluble substances as well as the slightly water soluble substances used during the homogenization are inert, to the extent that they do not participate in a subsequent polymerization reaction. The same applies to the partly water soluble substance added to the emulsion to become absorbed therein. In order to prepare a polymer dispersion, initiator as well as monomer must be present. A polymerization initiator may be in the form of a highly water insoluble substance and/or a slightly water soluble substance homogenized in the preparation of the stabilized emulsion, and/or it may be in the form of a partly water soluble substance added to the stabilized emulsion to become absorbed by the droplets thereof, and/or it may be in the form of a completely water soluble substance in which case the initiator reacts with traces of monomer in the aqueous phase to prepare oligomer radicals which thereafter are adsorbed by the droplets of the stabilized emulsion. A monomer may be in the form of a highly water insoluble substance and/or a slightly water soluble substance homogenized in the preparation of the stabilized emulsion, and/or it may be in the form of a partly water soluble substance added to the stabilized emulsion to become adsorbed by the droplets thereof. Any combination of different types of monomer/initiator may be used, although some combinations are more practical than others. Thus, it may, for instance, be that the oily material of the homogenized emulsion is a highly water insoluble initiator such as dioctanoyl peroxide, alone or mixed with other components, and the partly water soluble material added in the next step to the emulsion is a vinyl monomer.

Normally, the amount of the partly water soluble material added in the second step will be much higher than the amount of oily material in the emulsion. When said partly water soluble material is a monomer which is polymerized, the resulting polymer particles will consist almost only of a polymer derived from said monomer.

Although a vinyl monomer will usually be added to the relatively stable emulsion, it may also be possible to add a vinyl monomer to the continuous phase where the initial homogenization is carried out. If initiator is also present in the oily material in addition to monomer, polymerization may be carried out directly after stabilization of the emulsion by dilution, or additional monomer may be added to the stabilized emulsion, and polymerization may then be carried out. Normally it is preferred to add most of or all monomer in the second step (after the stable emulsion has been prepared).

It may also be possible to use more than one type of monomer, such as a highly water insoluble monomer for preparing a stabilized emulsion and then also a partly water soluble monomer to be added to the emulsion. Similarly, two or more types of initiator may be used.

In a modification of the process for preparing a polymer dispersion, a partly water soluble vinyl monomer is added continuously or stepwise to the stabilized emulsion.

During the homogenization of the oily material the presence of the hydrophilic phase will promote the formation of an emulsion having a narrow size distribution of the droplets, and this narrow size distribution is subsequently stabilized by diluting the homogenized emulsion with water. When a partly water soluble material is subsequently added to the stabilized emulsion, said material will diffuse through the aqueous phase to become absorbed by the droplets of the stabilized emulsion, and the resulting droplets will have a similar narrow size distribution, but the droplets will be much larger, depending on the amount of partly water soluble material added to the stabilized emulsion. In the subsequent polymerization the narrow size distribution is essentially retained, and with an addition of large amounts of the partly water soluble material to the stabilized emulsion, the particle size of the polymer dispersion will be large.

The process of the present invention is especially preferable in the case one wants to prepare relatively large droplets containing the highly water insoluble liquid and in turn relatively large latex particles by absorption of monomer in these droplets as described above. Thus, the very narrow size distribution obtained by the present method in comparison with the use of, for instance, low pressure in the homogenizer, is especially striking in the case of relatively large droplets. In the preparation of latexes it may for many applications be an advantage with a large average size with a relatively narrow size distribution, so that the final latex will have a relatively narrow size distribution where both small particles below 1 μm and large particles above 10 μm and especially larger than 20 μm are absent. The absence of small particles may allow the preparation of dry latex powder without use of spray drying. By the present method one may produce a dispersion of the highly water insoluble compound in the first step with a relatively narrow size distribution. With proper choice of amount and type of the water soluble organic solvent used together with water in the outer phase and the type and amount of emulsifier applied in the homogenization process, it may be possible to obtain droplets in the range from 0.2–1 μm to 0.5–3 μm with neglible amount of smaller or larger droplets. After swelling with monomer and polymerization the resulting latexes may have particle sizes in the order of from 2–5 μm to latexes with sizes 3–10 μm. In this case most of the water may be removed from the polymer particles by settling, filtration or centrifugation which saves the cost of evaporation, and recovery of free particles is therefore simple to achieve.

An essential feature of the present process is the presence of an outer phase in which the dispersed phase has a higher solubility than in water during homogenization. As a consequence of this it is possible to apply a high homogenization pressure so that large droplets are effectively and continuously disrupted to finer droplets. At the same time the increased solubility in the outer phase may prevent the formation of too small droplets since the very small droplets are continuously removed due to a diffusion process. When the mixture leaves the homogenizer and is immediately diluted with water, the degradation by diffusion is effectively stopped. The fact that one has relatively large droplets comprising the highly water insoluble substance also results in an additional stability towards degradation by diffusion during storing after the dispersion from the homogenizer has been diluted with water.

It is known to obtain a dispersion of highly water insoluble liquids in water with a relatively high average diameter by use of a reduced pressure during homogenization or by storing a finely dispersed system obtained by homogenization at high pressure, optionally at high temperature or by addition of an organic solvent soluble in water after homogenization. These methods invariably give much broader size distribution than the distribution obtained by the process of the present invention.

In the experiments described below there is sometimes used an anionic emulsifier such as sodium lauryl sulphate (SLS), and sometimes a steric stabilizer such as Hypermer CG-6 from ICI. The reason for this is that SLS operates well in water but functions steadily poorer when the proportion of water soluble organic solvent in the continuous phase increases. On the other hand, the steric stabilizer is less effective with pure water in the continuous phase and compared to SLS becomes steadily more effective when the proportion of the water soluble organic solvent in the outer phase increases.

The mean droplet/particle size has been determined using either Coulter NanoSizer or Coulter LS-130 instruments from Coulter Electronics. The Coulter NanoSizer gives a polydispersity factor scaled from 0 til 10, where 0 indicates an almost monodisperse system while 10 is a completely polydisperse system. Histograms of droplet/particle size distributions have been obtained with Coulter LS-130. The Coulter LS-130 gives the degree of distribution as coefficient of variation (CV), which is the standard deviation divided by the mean droplet/particle size.

BRIEF DESCRIPTION OF DRAWINGS

FIGS. 1–12 are histograms illustrating the size distribution of the particles/droplets in each experiment. The abscissa is the particle/droplet diameter, μm, and the ordinate is volume %.

EXAMPLE 1

Dioctanoyl peroxide, Perkadox SE-8 from Akzo Chemie, 15 grams, was added to 150 ml of water containing 0.5 gram of sodium lauryl sulphate (SLS). The mixture was first treated in an Ultraturax and thereafter 5 times in a Manton Gaulin Homogenizer at a pressure of about 400 kg per cm$^2$. After homogenization there was immediately added 300 ml water to 10 ml of the emulsion. The droplet size was measured by a Nanosizer and it was found that the average diameter was about 0.15 μm with a polydispersity factor of 3.

EXAMPLE 2

Figure 1:
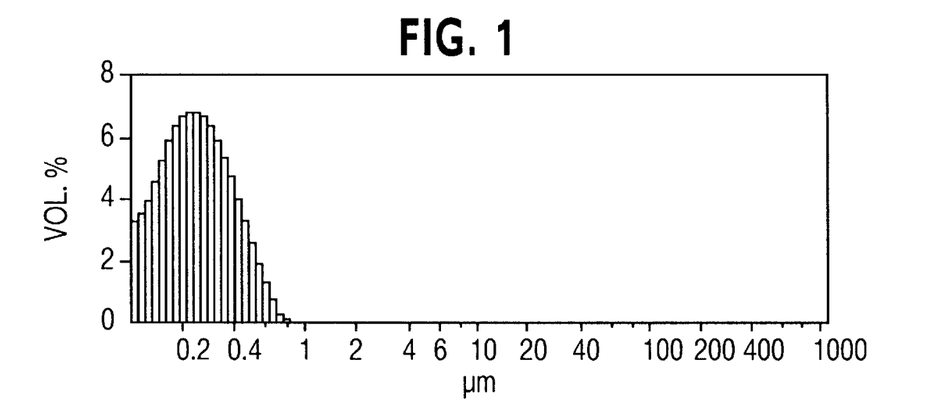
FIG. 1 illustrates the results of Example 2

Dioctyl adipate (DOA), from Exxon Chemicals, 15 grams, was applied instead of Perkadox SE-8. Otherwise the procedure was the same as in Example 1. The droplet size was measured by a Coulter LS-130. The results are given in FIG. 1. The mean diameter is 0.26 μm with a standard deviation of 0.13 μm. (CV=48%)

EXAMPLE 3

The procedure was the same as in Example 1, with the exception that instead of pure water, a mixture of methanol and water was used in a weight ratio 45/65, and instead of SLS, a steric emulsifier, Hypermer CG-6 was used. After homogenization there was immediately added 300 ml water to 10 ml of the emulsion to stabilize the emulsion towards further degradation by diffusion. The droplet diameter measured by the Nanosizer was 0.38 μm with a polydispersity factor of 2.

EXAMPLE 4

The procedure was the same as in Example 3, but the methanol/water ratio was in this case 60/40. The average diameter of the droplets measured by the Nanosizer was in this case 0.54 μm with a polydispersity factor of 1.

EXAMPLE 5

The procedure was the same as in Example 3, but the methanol/water ratio was in this case 75/25. The average diameter of the droplets measured by the Nanosizer was in this case 1.50 μm with a polydispersity factor of 0.

The polydispersity factor in Examples 3 to 5 given by the Nanosizer varied between 2 and 0. It should be noted that this factor is uncertain, but the results indicate a clear improvement in monodispersity when the amount of methanol in the continuous phase is increased.

EXAMPLE 6

The procedure was the same as in Example 3, but the methanol was replaced by acetone and the ratio acetone/water was 30/70. The average droplet diameter measured in the Nanosizer was 0.25 μm with a polydispersity factor of 1.

EXAMPLE 7

The procedure was the same as that used in Example 6, but the acetone/water ratio was in this case 50/50. The average droplet diameter measured in the Nanosizer was 0.58 μm with a polydispersity factor of 0.

EXAMPLE 8

Figure 2:
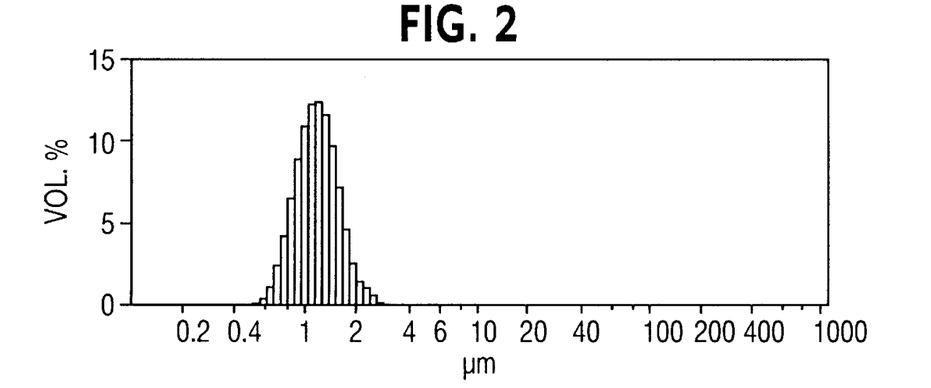
FIG. 2 illustrates the results of Example 8

Dioctyl adipate (DOA), 15 grams, was added to a mixture of 120 g methanol and 30 gram water to which 0.5 gram of a steric emulsifier, Hypermer CG-6 had been added. The mixture was first treated in an Ultraturax and thereafter 5 times in a Manton Gaulin Homogenizer at a pressure of about 400 kg per cm$^2$. Immediately after leaving the homogenizer there was added 300 ml water to 10 ml of the emulsion containing 0.77 gram DOA. The size and size distribution was measured by a Nanosizer and by a Coulter LS-130. The Nanosizer gave as result an average diameter of 0.925 μm with a polydispersity factor of 1. The Coulter LS-130 gave as result an average diameter of 1.24 μm with standard deviation of 0.36 μm (CV=29%). In FIG. 2 there is shown a histogram of the droplet size distribution obtained by the Coulter LS-130. It will appear that the lower limit in droplet size is about 0.5 μm and the upper limit about 3 μm.

EXAMPLE 9

Figure 3:
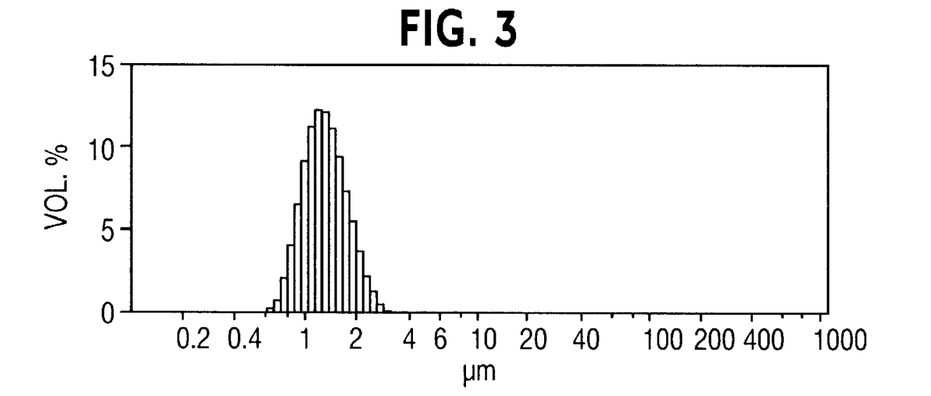
FIG. 3 illustrates the results of Example 9

DOA, 15 grams, was added to a mixture of 120 gram methanol and 30 gram water to which there had been added 1.5 gram of an anionic emulsifier Empicol 0332 (29% sodium lauryl sulphate in water, from Albright & Wilson UK). The mixture was treated as described in Example 8 using Ultraturax followed by 5 times treatment in a Manton Gaulin homogenizer at 400 kg per cm$^2$. Immediately after leaving the homogenizer there was added 300 ml water to 10 ml of the emulsion containing 0.77 gram DOA. The Coulter LS-130 gave as result an average diameter of 1.39 μm with a standard deviation of 0.41 μm (CV=29%). In FIG. 3 is shown a histogram of the droplet size distribution obtained by the Coulter LS-130. It will appear that the lower limit in droplet size is about 0.6 μm and the upper limit about 3 μm.

EXAMPLE 10

Figure 4:
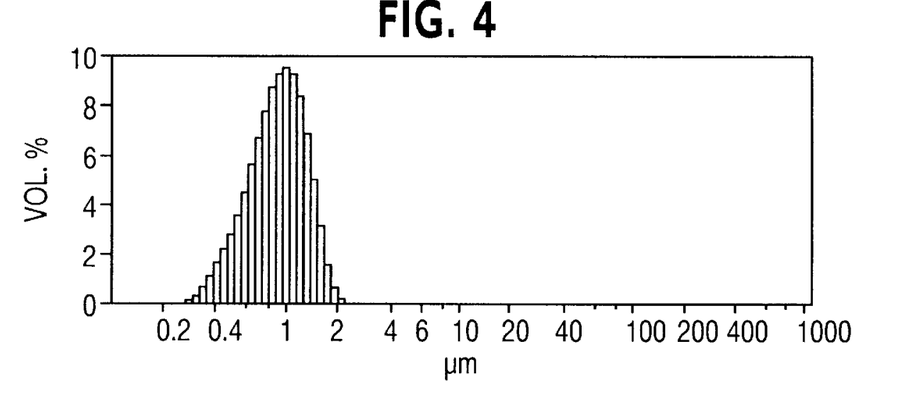
FIG. 4 illustrates the results of Example 10

Dioctanoyl peroxide, Perkadox SE-8, 15 grams, was added to a mixture of 120 gram methanol and 30 gram water to which there had been added 0.5 gram of a steric emulsifier, Hypermer CG-6. The homogenization process by Ultraturax and Manton Gaulin Homogenizer was performed as described in Example 3. 300 ml of water was added to 11,03 grams of the emulsion to stabilize the emulsion. From the histogram shown in FIG. 4, it appears that the lower limit in the droplet size is about 0.3 μm, and the upper limit about 2 μm. The mean diameter is 0.95 μm and the standard deviation 0.34 μm (Coef. Var. 35%)

EXAMPLE 11 (Comparative Example)

Figure 5:
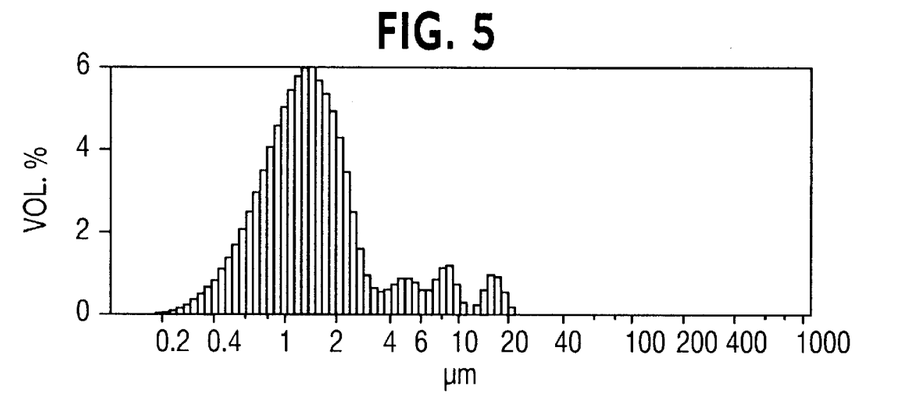
FIG. 5 illustrates the results of Example 11

The process was carried out as described in Example 8 except that the emulsification was carried out without use of methanol. DOA, 15 grams, was mixed with 150 ml water to which there had been added 0.5 gram of a steric emulsifier, Hypermer CG-6, and the mixture was treated in the Ultraturax and in the Manton Gaulin Homogenizer as described above, with exception that the pressure was reduced to 200 kg per cm$^2$ in order to increase the average size of the droplets as compared to what was obtained using pure water at 400 kg per cm$^2$ as described in Example 2, where the average droplet diameter was 0.26 μm. The size and size distribution measured by the Coulter LS-130 is shown in FIG. 5. It will appear that compared with the results obtained in Example 8, the size distribution is much broader. Especially it should be noted that in this case droplets with sizes down to 0.2 μm and a considerable amount of large droplets up to about 20 μm are present. The mean diameter is 2.43 μm.

EXAMPLE 12 (Comparative Example)

Figure 6:
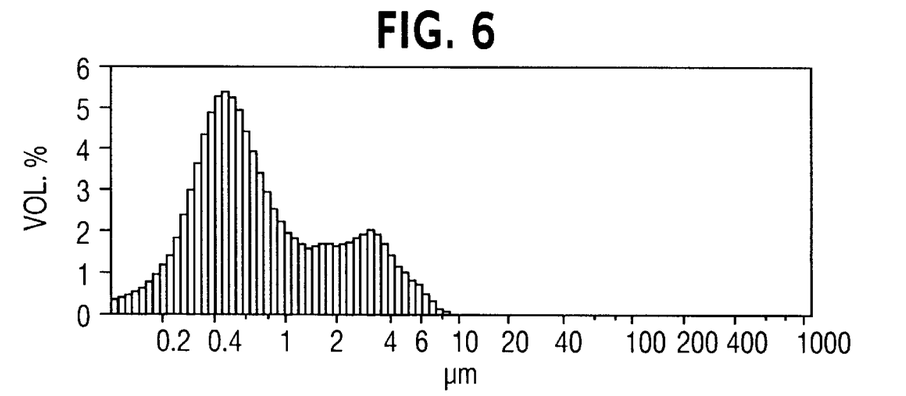
FIG. 6 illustrates the results of Example 12

The process was carried out without use of methanol. DOA, 15 grams, was mixed with 150 gram water containing 0.5 gram SLS. The mixture was treated as described in Example 11, but the pressure in the Manton Gaulin homogenizer was reduced to 100 kg per cm$^2$. The result from the measurement with Coulter LS-130 is shown in FIG. 6. The mean diameter is 1.17 μm and the standard deviation 1.30 μm. (CV=111%). Again it appears that one in comparison with Example 8 has a much broader size distribution.

Compared with Example 11 it is seen that SLS functions better than Hypermer CG-6 with pure water as the continuous phase, but that the attempt to get larger droplets with a reasonably small size distribution by reducing the pressure in the homogenizer has failed.

EXAMPLE 13

Figure 7:
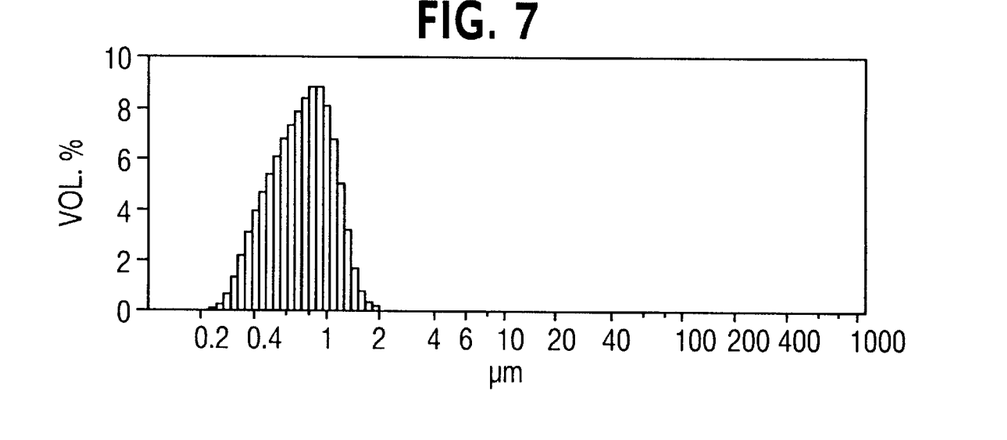
FIG. 7 illustrates the results of Example 13

Dioctyl adipate (DOA), 5 grams, and 10 grams of toluene were added to a mixture of 120 grams of methanol and 30 grams of water to which 0.5 gram of the steric emulsifier, Hypermer CG-6 had been added. The homogenization procedure, stabilization by dilution and measurement of droplet size was carried out as described in Example 8. In FIG. 7 there is shown a histogram of the droplet size distribution obtained with the Coulter LS-130. The average diameter is 0.78 μm and the standard deviation 0.29 μm (CV=37%).

Example 13 thus demonstrates that relatively large droplets with a relatively narrow distribution of droplet size may also be obtained by using a mixture of a highly water insoluble compound such as DOA and a slightly water soluble compound such as toluene.

The results given above clearly demonstrate that one by the process of the present invention may obtain dispersions of highly water insoluble compounds with a controlled and narrow size distribution and especially one may obtain relatively narrow size distributions even with relatively large droplets.

Below there are described examples of application of the dispersions of the highly water insoluble compounds in accordance with Norwegian Patent 139.410 where the droplets of the highly water insoluble compound are swollen with a large amount of monomers, whereafter polymerization is carried out. The intention of these experiments is to show that the present method allows the preparation of latexes with a relatively large particle size which in spite of this have a relatively narrow size distribution.

EXAMPLE 14

Figure 8:
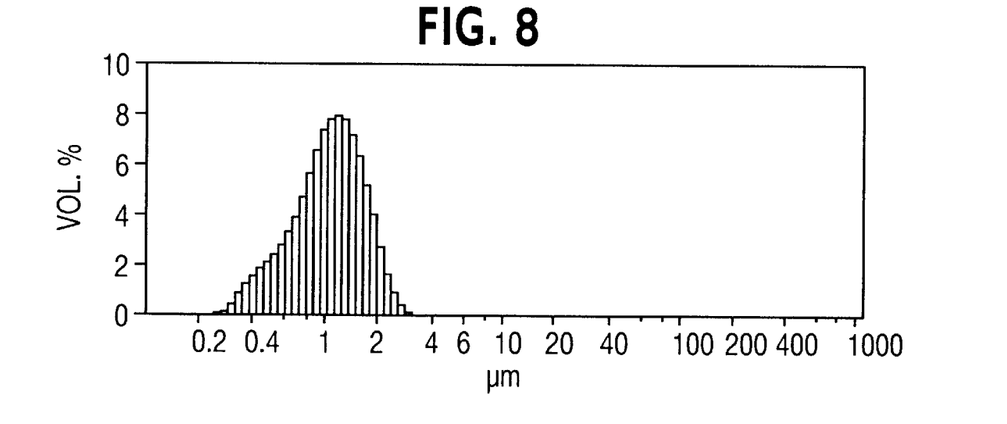
FIG. 8 illustrates the results of Example 14

Stearylmethacrylate, 15 grams, was added to a mixture of 120 grams of methanol and 30 grams of water to which 0,5 grams of steric emulsifier, Hypermer CG-6, had been added. The homogenization procedure, stabilization by dilution and measurement of droplet size was carried out as described in Example 8. In FIG. 8 there is shown a histogram of the droplet size distribution obtained by the Coulter LS-130. The average diameter is 1.16 μm and the standard deviation 0.50 μm (CV=43%)

EXAMPLE 15

Preparation of PVC latex

Dioctyl adipate (DOA), 15 grams, was added to a mixture of 120 g methanol and 30 gram water to which there had been added 0.5 gram of a steric emulsifier, Hypermer CG-6, as in Example 8. The mixture was first treated in an Ultraturax and thereafter 5 times in a Manton Gaulin Homogenizer at a pressure of about 400 kg per cm$^2$. Immediately after leaving the homogenizer 300 ml water was added to 11.03 grams of the emulsion containing 1.0 gram DOA. To 70.6 grams of the diluted emulsion there was added 54.06 grams of water containing 0.30 gram of a polymeric, nonionic stabilizer, Methocel K-100, from Dow, and 0.038 gram potassium iodide (KI). Then 23.5 grams of vinyl chloride was added and was allowed to swell the DOA droplets for one hour at 20° C. before addition of 0.25 gram of an azo initiator, Wako V-59, from Wako Pure Chemical Industries Ltd., dissolved in 0.25 gram methanol. The polymerization was carried out at 60° C. for 3.5 hours.

Figure 9:
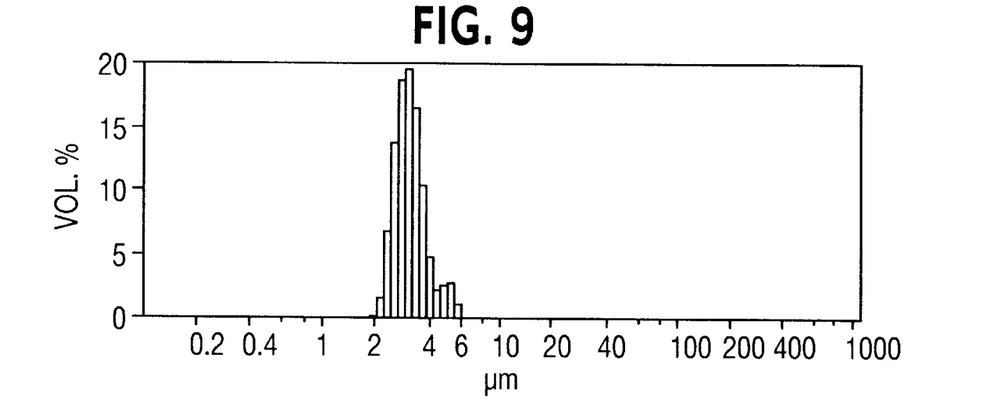
FIG. 9 illustrates the results of Example 15

The size distribution as obtained from the Coulter LS-130 is shown in FIG. 9. It appears that the size distribution is relatively narrow. There are no particles with size below 2 μm and none above 6 μm, most of the particles being between 2.5 and 4 μm. The mean diameter is 3.2 μm and the standard deviation 0.7 μm (CV=22%).

EXAMPLE 16

Preparation of PVC latex

Dioctanoyl peroxide (Perkadox SE-8), 15 grams, was added to a mixture of 120 grams of methanol and 30 grams water to which there had been added 0.5 gram of the steric emulsifier, Hypermer CG-6, as in Example 10. The mixture was homogenized in an Ultraturax and subsequently 5 times in a Manton Gaulin Homogenizer in the usual manner at 400 kg per cm$^2$. To 11.03 grams of this emulsion there was added 300 ml of water immediately after homogenization. Then there was added 289 grams of water containing 1.2 grams Methocel K-100 and 0.19 grams of KI to the emulsion. After evacuation addition was made of 117.5 grams of vinyl chloride which was allowed to swell the dioctanoyl peroxide droplets for 1 hr at 20° C. Then the temperature was raised to 60° C. Polymerization was carried out at this temperature until a pressure drop to 5 atm., which took 5 hours.

Figure 10:
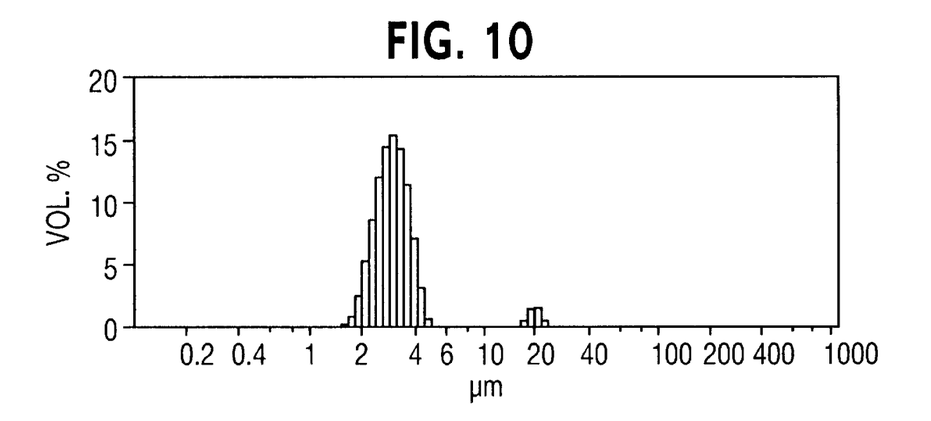
FIG. 10 illustrates the results of Example 16

The size distribution of the final latex as obtained from the Coulter LS-130 is shown in FIG. 10. It will be seen that besides a very small amount of agglomerated particles appearing around 20 μm, one finds that for the vast majority of particles, the size distribution is very narrow with a mean diameter of ca. 3 μm.

EXAMPLE 17

Comparative Example

Figure 11:
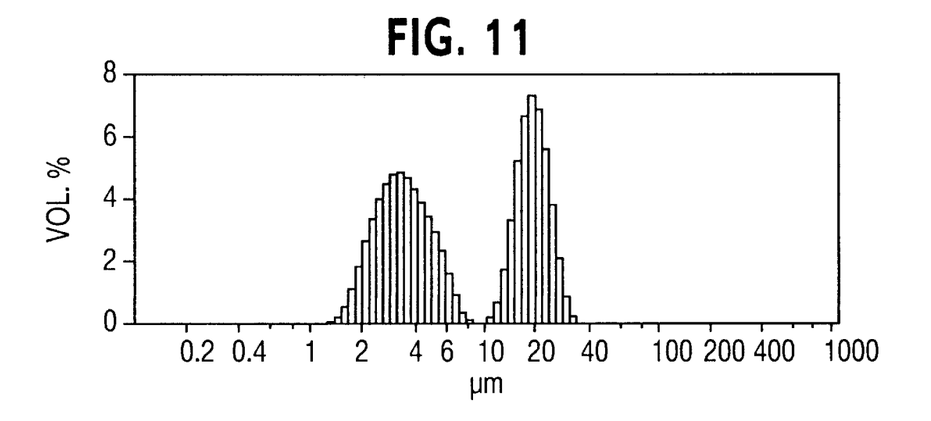
FIG. 11 illustrates the results of Example 17

Like the comparative example for preparation of emulsions of DOA alone, Example 11, this example was also carried out in the way that no methanol was applied in the preparation of the DOA emulsion. The pressure applied in the Manton Gaulin treatment was reduced to 200 kg per cm$^2$. The emulsion was applied for preparation of PVC latex as described in Example 15. The size distribution of the final latex as obtained from the Coulter LS-130 is shown in FIG. 11. It will appear that one has got a very broad size distribution with a sort of bidisperse distribution. It should be noticed that one in this case also has a noticeable amount of particles below 2 μm in addition to the large amount of particles in the range above 10 μm.

EXAMPLE 18

Preparation of polystyrene latex

Figure 12:
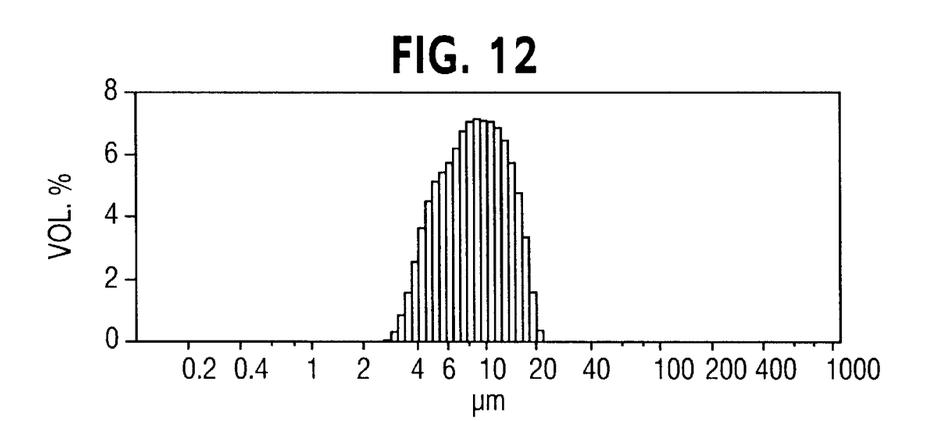
FIG. 12 illustrates the results of Example 18.

The preemulsion of dioctanoyl peroxide was prepared with the same ingredients, the same amount and the same homogenization procedure as described in Example 16. To 11.03 grams of the emulsion there was added 300 ml water. To this emulsion there was added a mixture of 353 grams water containing 1.95 grams of a steric emulsifier, Methocel K-100, 0.19 gram KI, 0.40 gram SLS and 100 grams styrene which had been homogenized in the Ultraturax. The styrene was allowed to swell the dioctanoyl peroxide droplets over night at 25° C. Then 237 grams water containing 0.7 gram Methocel K-100 was added. The temperature was raised to 70° C. and the polymerization was carried out at this temperature for 12 hours. The result of the particle examination of the final latex by the Coulter LS-130 is shown in FIG. 12. The mean diameter is 9 μm and the standard deviation 4 μm. (CV=42%)

What is claimed is:

1. Process for preparing an aqueous emulsion with a narrow droplet size distribution of an oil material including one or more highly water insoluble substances, wherein the oily material is homogenized in a hydrophilic phase in which the oily material which contains at least 10% by weight of one or more highly water insoluble substances having a solubility of less than 10$^{-2}$ gram per liter in pure water at 20° C. or immediately above the melting temperature of the highly water insoluble substance if said melting temperature is higher, is more soluble than in water, but sufficiently insoluble to form an emulsion by the homogenization, and the emulsion is subsequently diluted with a high proportion of water to form a stable emulsion of the oily material having the desired narrow size distribution.

2. The process of claim 1, wherein the oily material includes a polymerization initiator.

3. The process of claim 1, wherein the oily material includes a polymerizable vinyl monomer.

4. The process of any of claims 1 to 3, wherein the hydrophilic phase is a mixture of water and an organic solvent.

5. The process of claim 4, wherein the organic solvent is a lower alkanol or a lower dialkyl ketone.

6. The process of any of claims 1 to 3, wherein the stable emulsion of the oily material is mixed with an excess of a partly water soluble material which diffuses through the aqueous phase to become absorbed by the droplets of the oily material to form an emulsion where the droplets are larger than the droplets of the oily material prior to the above mixing, have a similar narrow size distribution and consist primarily of said partly water soluble material.

7. The process of claim 4, wherein the stable emulsion of the oily material is mixed with an excess of a partly water soluble material which diffuses through the aqueous phase to become absorbed by the droplets of the oily material to form an emulsion where the droplets are larger than the droplets of the oily material prior to the above mixing, have a similar narrow size distribution and consist primarily of said partly water soluble material.

8. The process of claim 5, wherein the stable emulsion of the oily material is mixed with an excess of a partly water soluble material which diffuses through the aqueous phase to become absorbed by the droplets of the oily material to form an emulsion where the droplets are larger than the droplets of the oily material prior to the above mixing, have a similar narrow size distribution and consist primarily of said partly water soluble material.

9. The process of claim 6, wherein the partly water soluble material includes two or more different components which may be added together or separately to the emulsion of the oily material.

10. The process of claim 6, wherein the partly water soluble material includes a polymerizable vinyl monomer.

11. The process of claim 9, wherein the partly water soluble material includes a polymerizable vinyl monomer.

12. The process of claim 6, wherein the partly water soluble material includes a polymerization initiator.

13. The process of claim 9, wherein the partly water soluble material includes a polymerization initiator.

14. The process of claim 10, wherein the partly water soluble material includes a polymerization initiator.

15. The process of claim 11, wherein the partly water soluble material includes a polymerization initiator.

16. Process for preparing a polymer dispersion with a narrow particle size distribution, wherein an oily material is homogenized in a hydrophilic phase in which the oily material which contains at least 10% by weight of one or more highly water insoluble substances having a solubility of less than $10^{-2}$ gram per liter in pure water at 20° C. or immediately above the melting temperature of the highly water insoluble substance if said melting temperature is higher, is more soluble than in water, but sufficiently insoluble to form an emulsion by the homogenization, and the emulsion is subsequently diluted with a high proportion of water to form a stable emulsion of the oily material having the desired narrow size distribution, and optionally, said first emulsion of the oily material is mixed with an excess of a partly water soluble material which diffuses through the aqueous phase to become absorbed by the droplets of the oily material to form a second emulsion where the droplets are larger than the droplets of the oily material prior to the above mixing, have a similar narrow size distribution and consist primarily of said partly water soluble material, wherein said oily material and/or said partly soluble material includes a polymerization initiator, and said oily material and/or said partly soluble material includes a polymerizable vinyl monomer, and the first emulsion or, if it has been prepared, the second emulsion is subjected to polymerization conditions to form a polymer dispersion having a narrow particle size distribution similar to that of the droplets in the preceding emulsion.

17. Process for preparing a polymer dispersion with a narrow particle size distribution, wherein an oily material is homogenized in a hydrophilic phase in which the oily material which contains at least 10% by weight of one or more highly water insoluble substances having a solubility of less than $10^{-2}$ gram per liter in pure water at 20° C. or immediately above the melting temperature of the highly water insoluble substance if said melting temperature is higher, is more soluble than in water, but sufficiently insoluble to form an emulsion by the homogenization, and the emulsion is subsequently diluted with a high proportion of water to form a stable emulsion of the oily material having the desired narrow size distribution and optionally, said first emulsion of the oily material is mixed with an excess of a partly water soluble material which diffuses through the aqueous phase to become absorbed by the droplets of the oily material to form a second emulsion where the droplets are larger than the droplets of the oily material prior to the above mixing, have a similar narrow size distribution and consist primarily of said partly water soluble material, wherein said oily material and/or said partly soluble material includes a polymerizable vinyl monomer, and the first emulsion or, if it has been prepared, the second emulsion is subjected to polymerization conditions in the presence of a water soluble polymerization initiator to form a polymer dispersion having a narrow particle size distribution similar to that of the droplets in the preceding emulsion.

18. The process of any of claims 16 and 17, wherein a partly water soluble polymerizable vinyl monomer is added during polymerization.

19. Process for preparing polymer particles having a narrow size distribution, wherein the particles from the polymer dispersion prepared according to any of claims 16 and 17 are recovered.

20. Process for preparing polymer particles having a narrow size distribution, wherein the particles from the polymer dispersion prepared according to claim 18 are recovered.

* * * * *